Sept. 3, 1929.   A. H. PHILLIPS   1,727,250
FRUIT PACKER
Filed Dec. 12, 1925   2 Sheets-Sheet 1
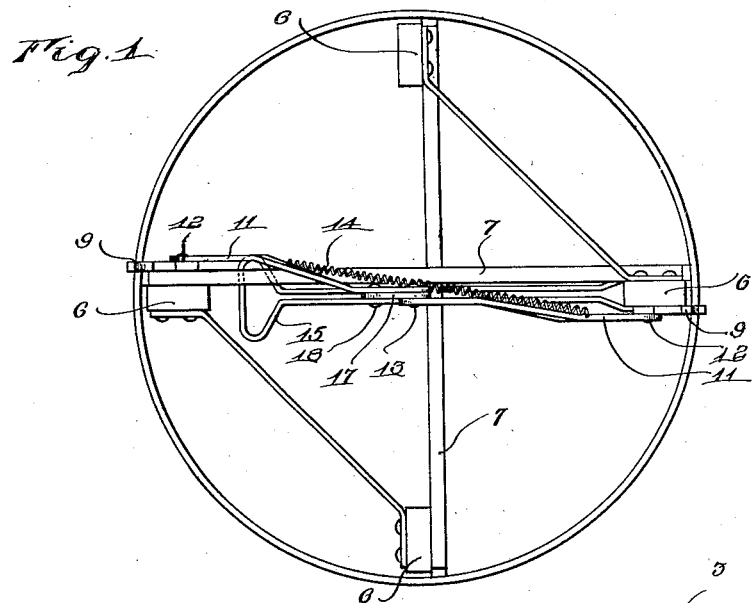
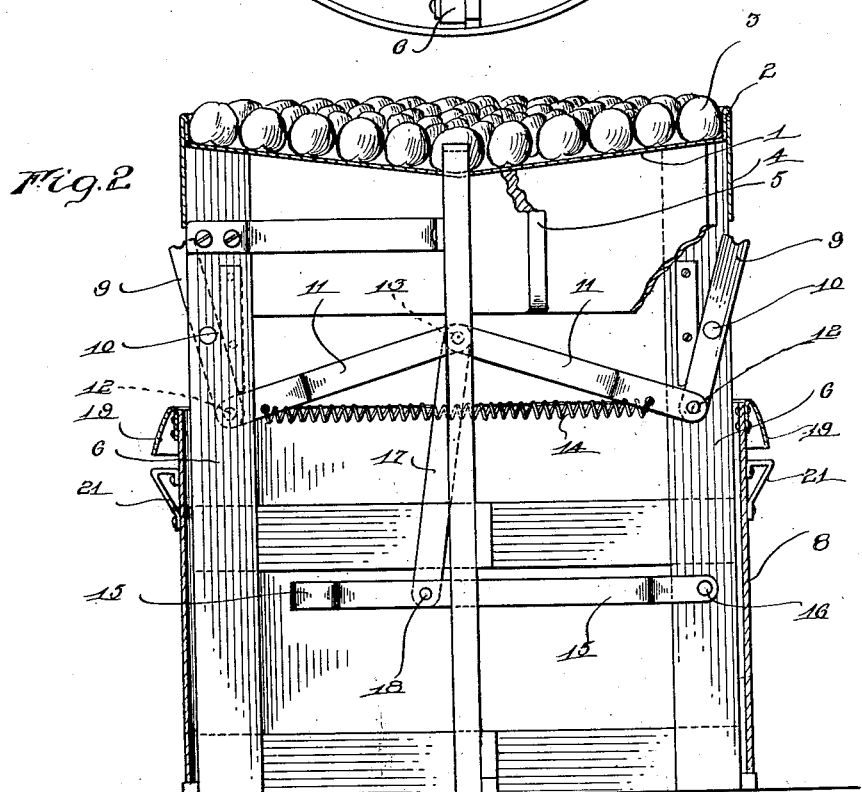
INVENTOR
Arthur H. Phillips.
BY
his ATTORNEYS

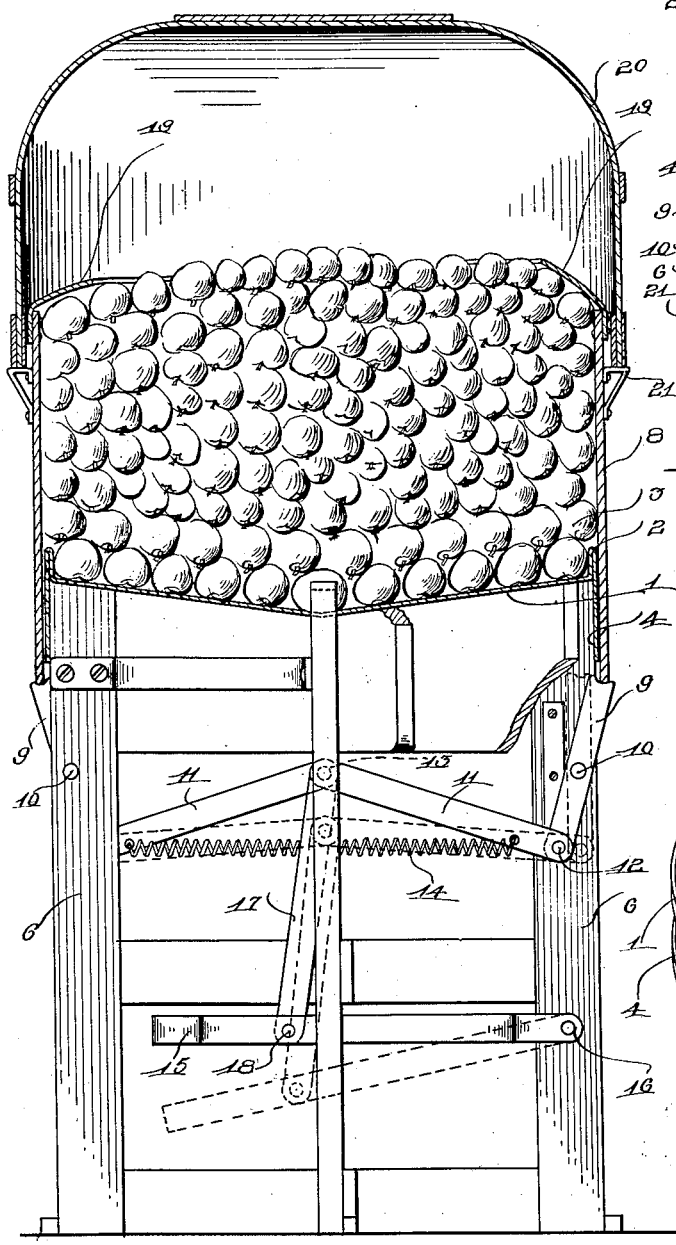
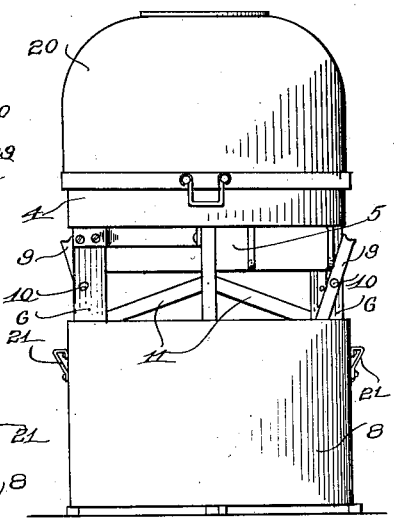
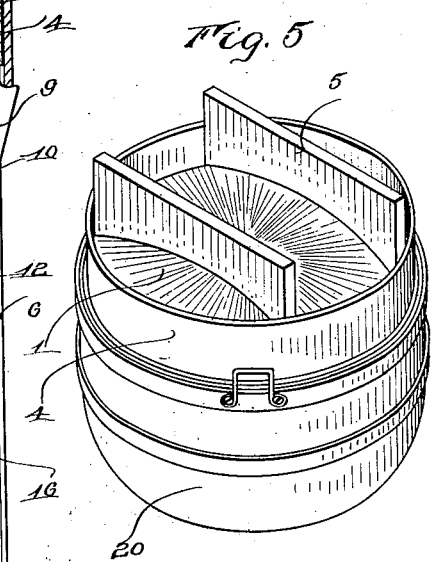

Patented Sept. 3, 1929.

1,727,250

UNITED STATES PATENT OFFICE.

ARTHUR H. PHILLIPS, OF HULBERTON, NEW YORK.

FRUIT PACKER.

Application filed December 12, 1925. Serial No. 74,982.

The present invention relates to packaging apparatus for fruit, vegetables or the like, and an object of the invention is to provide a novel means by which the articles in the top layer of a package or container may be arranged in an ornamental manner. A still further object of the invention is to provide an apparatus through which articles to be placed in a container or receptacle are first arranged in an inverted position in the apparatus with the top layer undermost and are thereafter placed in the container or receptacle without materially disturbing the top layer. Still another object of the invention is to provide an apparatus employing a facing member on which the top layer is first laid in any desired form combined with a ring or confining member which is adapted to extend above the facing member, for the purpose of confining on the facing member the other articles which are to be placed in the shipping receptacle.

To these and other ends, the invention consists of certain parts and combinations of parts, all of which will be hereinafter described: the novel features being pointed out in the appended claims.

In the drawings:

Fig. 1 is a plan view of an apparatus constructed in accordance with this invention;

Fig. 2 is a side view with the confining ring or member in section and in lowered position so that the facing layer may be placed upon the facing member;

Fig. 3 is a similar view showing the confining member or ring elevated to project above the facing member, and the packing container or receptacle supported on the confining ring, the receptacle and confining ring being shown in section;

Fig. 4 is a side view of the apparatus showing the confining ring in lowered position and the packing receptacle in cooperative relation with the facing member prior to the inversion of these two parts; and Fig. 5 is a perspective view showing the packing receptacle and facing member inverted, prior to the removal of the facing member.

The invention embodies generally a facing member and a confining ring or member so mounted that the facing member may lie above the confining ring or member for receiving the facing layer, and the confining ring or member may extend above the facing member for confining the articles above the facing layer for introduction into the packing container or receptacle.

In the illustrated embodiment of the invention the facing member is in the form of a concave disk 1 formed with a flange 2 on one side to provide a cup shaped member in which the fruit or articles 3 of the facing may be deposited as, for instance, in concentric rings. A flange 4 projects from the opposite or underside of the concave member in order to support the latter upon a suitable standard or support. If desired, parallel ribs or strips 5 may be secured to the underside of the concave disk 1 within the flanges 4 for the purpose of strengthening the concave member.

The supporting means or stand, in this instance, embodies four uprights or standards 6 connected by cooperating pieces 7 and having their upper ends inclined slightly toward the center of the stand or support so as to cooperate with the concave disk 1, the outer faces of the standards 6 being engaged by the annular flange 4 on the concave disk 1 in order to properly position the facing member upon the support.

The confining member 8 may be of any suitable construction. In this instance, it is in the form of an open ended cylinder or ring. the internal diameter of which is slightly greater than the diameter of the facing member so that the confining member or ring 8 may surround the support and lie in a position below the facing member as illustrated in Fig. 2, in order that the facing member may lie exposed for the placing of the facing layer of fruit or articles 3 thereon.

After the facing layer has been laid upon the facing member as illustrated in Fig. 2, the confining member is elevated on the support and so as to surround the facing member while at the same time projecting above the facing member as illustrated in Fig. 3 in order that the fruit or other articles which are to be placed in the packing receptacle or container beneath the facing layer may be sustained upon the facing layer.

With the end in view of supporting the confining member in a position projected above the facing member, suitable sustaining means is provided. In this instance, two latches or detents 9 are employed pivoted at 10 and connected by two links 11 which are pivoted at 12 to the latches or detents and at 13 to each other. These two links form between them a toggle which when broken or bent upwardly throws the upper ends of the latches outwardly in sustaining positions but which, when extended, tends to throw the upper ends of the latches or detents 9 inwardly. A spring 14, anchored to the two links 11 of the toggle, tends to break the toggle or bend in upwardly as illustrated in Fig. 2. Any suitable means may be employed for straightening the toggle to move the detents or latches 9 away from sustaining positions. In this instance, a foot lever 15 pivoted at 16 to one of the standards is connected by a link 17 to the knuckle 13 of the toggle, the link in turn being pivoted at 18 to the foot lever. Depression of the foot lever tends to expand or straighten the toggle and move the latches 9 inwardly out of sustaining positions. When the confining member 8 is elevated the upper edge cooperates with the sides of the latches and presses them inwardly against the action of the spring 14 until the lower end of the confining member 8 has passed above the upper ends of the latches, when the latter move outwardly under the action of the spring 14 into sustaining positions.

After the confining member 8 has been filled as indicated in Fig. 3 of the drawings with the articles to be packed, a flexible extension 19 as, for instance, a sheet of fabric along the upper edge of the confining member 8 is thrown over the articles as shown in Fig. 3 and, thereafter, the receptacle or container 20 is fitted in inverted position about the upper edge of the confining member 8, being supported on rests or supports 21 preferably projected laterally from the sides of the confining member 8 below the upper edge of the latter.

When the parts are in the positions shown in Fig. 3, the foot lever 15 is depressed. This throws the latches 9 out of engagement with the lower edge of the confining member 8, permitting the latter with the inverted receptacle 20 to lower with reference to the facing member, the operator placing his hands upon the confining member to brake the descent of the latter. With the descent of the confining member 8 the articles supported on the facing member are projected into the receptacle 20 and the latter finally descends until the bottom wall rests upon the top of the articles, the confining member 8 continuing its movement until it reaches its lowermost position as illustrated in Fig. 4. The recetacle 20 will then have its edge surrounding the upper edge of the facing member and fruit or other articles will lie within the receptacle. The flexible extension 19 prevents the bruising of the fruit and confines the latter against displacement as the confining member passes out of connection with the receptacle 20. After the parts have reached the positions shown in Fig. 4, the facing member with the receptacle and the fruit or articles therein is removed from the support and inverted to the position shown in Fig. 5, after which the facing member may be removed and the receptacle then provided with the cover. It will be found that the fruit which was placed in the confining member 8 and upon the facing member will lie in the receptacle 20 in substantially the same condition that it occupied in the confining member and upon the facing member. The top surface may have an ornamental form and will be convex so that, when the cover is put on and sprung down, the contents of the receptacle will be under pressure.

From the foregoing it will be seen that there has been provided a novel apparatus which permits the packing of fruit or other articles in a container with a facing layer ornamentally arranged, as, for instance, in concentric rings, and also convexed so that, when the cover is placed upon the receptacle, the cover will have to be sprung and in this way place the contents under pressure so as to prevent the material moving in the receptacle. These results are secured by the employment of a facing member and a confining member mounted for relative movement, so that, at one time the facing member lies above the confining member in order to expose the facing layer, and, at another time, the confining member lies above the facing member in order to receive the articles which are to be arranged in the packing receptacle below the facing layer. The relative movement also permits the material or articles supported on the facing member to be inserted within the receptacle without any agitation of the articles. The result is preferably secured by mounting the facing member upon a standard on which the confining member is guided, the confining member normally lying below the facing member so that the latter may receive the facing layer, and being movable to project above the facing member so as to receive the articles which are to be placed in the packing container or receptacle. This confining member is provided with supporting means for the receptacle and drops the receptacle over the material on the facing member as the confining means moves downwardly below the facing member. Provision is made at the upper edge of the confining member for preventing agitation of the articles as the confining member passes out of connection with the receptacle.

What I claim as my invention and desire to secure by Letters Patent is:

1. An apparatus of the class described comprising a support, a facing member removably arranged upon said support, and a confining member guided on said support to move below the under side of the facing member in order to permit the latter to be supplied with a facing layer and also to be removed with the basket from the support, and to move above the upper edge of the facing member in order to permit the confining member to receive the articles to be contained in the packing receptacle.

2. An apparatus of the class described comprising a support, a facing member removably arranged upon said support, a confining member guided on said support to move below the under side in order to permit the latter to be supplied with a facing layer and also to be removed with the basket from the support, and to move above the upper edge of the facing member in order to permit the confining member to receive the articles to be contained in the packing receptacle, and releasable means for sustaining said confining member in its upper position.

3. An apparatus of the class described comprising a support, a facing member movably arranged upon said support, a confining member guided on said support to lie below the upper edge of the facing member in order to permit the latter to be supplied with a facing layer, and to move above the upper edge of the facing member in order to permit the confining member to receive the articles to be contained in the packing receptacle, and releasable means for sustaining said confining member in its upper position, said means comprising a pair of pivoted detents for cooperating with the edge of the confining member, a toggle connecting said detents, a spring acting on the toggle to hold the detents in sustaining position, and means acting on the toggle for moving the detents from sustaining position.

4. An apparatus of the class described comprising a support, a facing member movably arranged upon said support, and a confining member guided on said support to lie below the upper edge of the facing member in order to permit the latter to be supplied with a facing layer, and to move above the upper edge of the facing member in order to permit the confining member to receive the articles to be contained in the packing receptacle, said means comprising movable detents for cooperating with the lower edge of the confining member and a common means for moving said detents.

5. An apparatus of the class described comprising a support employing a plurality of upright standards, spaced apart, a facing member removably resting on the upper ends of said upright standards so that its under side may be reached between the standards, and having an upwardly projecting flange for confining the facing layer and a downwardly extending flange for cooperating with the outer faces of said standards, and a confining member guided on the outer faces of said standards to move below the under face of the facing member or to be projected above said facing member.

6. An apparatus of the class described comprising a support, a facing member removably supported on said support and having an upwardly extending flange for confining the facing layer, and a downwardly extending flange engaging about said support, and a confining member guided vertically upon said support to lie below the under face of said facing member or to be projected above the upper edge of said facing member.

7. An apparatus of the class described comprising a support, a facing member removably arranged upon said support, a confining member guided on the support to lie below the upper edge of the facing member or to be projected above the upper edge of said facing member, and means carried by said confining member, for supporting a packing receptacle in an inverted position.

8. An apparatus of the class described comprising a support, a facing member removably arranged upon said support, a confining member guided on the support to lie below the upper edge of the facing member or to be projected above the upper edge of said facing member, and means carried by said confining member, for supporting a packing receptacle in an inverted position, said means comprising rests projected from the outer face of the confining member below the upper edge of the latter so that the edge of the packing receptacle fits about the upper edge of the confining member in an inverted position.

9. An apparatus of the class described comprising a removable facing member, a confining member, means for supporting a basket on the confining member, means for supporting said facing member and confining member for relative movement so that the lower face of the facing member may lie above the confining member or the upper edge of the confining member may lie above the upper face of the facing member, and means on the confining member for supporting a packing receptacle so that upon relative movement between the confining member and the facing member the articles on the facing member will enter the packing receptacle supported by the confining member and the under face of the facing member may be engaged by the hands to remove it from the supporting means.

10. An apparatus of the class described comprising a facing member, a confining member, means for supporting said facing member and confining member for relative movement so that the free edge of the facing member may lie above the confining member or the upper edge of the confining member may lie above the upper edge of the facing member, and flexible means at the upper edge of the confining member for cooperating with the fruit to prevent the latter being agitated upon the separation of the confining member and the packing receptacle.

11. A fruit basket packing device comprising supporting means upon which to rest a facing disk, a form mounted for vertical movement and when raised being cooperable with the facing disk in forming a receptacle in which to place the bulk of the fruit to be packed, and a facing disk free of attachment to all other parts of the device, permitting laying of the first layer of fruit on said disk at a point spaced from said supporting means, and allowing carrying of the disk and the fruit layer to said supporting means, provision being made for holding said form in the aforesaid raised position and for permitting rapid downward movement thereof when desired, said downward movement permitting transfer of the fruit from said form into a basket inverted thereon; the basket and facing disk being then bodily removable from the remainder of the device, permitting righting of the basket and use of the disk to hold the fruit in place while jostling the righted basket to settle the fruit.

12. A fruit basket packing device comprising supporting means upon which to rest a facing disk, a form mounted for vertical movement and when raised being cooperable with the facing disk in forming a receptacle in which to place the bulk of the fruit to be packed, a facing disk free of attachment to all other parts of the device, permitting laying of the first layer of fruit on said disk at a point spaced from said supporting means, and allowing carrying of the disk and the fruit layer to said supporting means, and quick-releasable means for normally holding said form in its raised operative position and for freeing said form when desired to permit rapid downward sliding thereof to effect the transfer of the fruit from the form into a basket inverted thereon; the basket and facing disk being then bodily removable from the remainder of the device, permitting righting of the basket and use of the disk to hold the fruit in place while jostling the righted basket to settle the fruit.

13. A fruit packer comprising a base, a facing disk supported removably thereby, said base having finger-receiving openings which open through its upper end and extend to points below the facing disk, and a packing form whose lower end surrounds said facing disk and base, said form and disk normally co-operating in forming a receptacle in which to pack the fruit, the upper end of said form serving to support an inverted fruit basket, whereby downward forcing of the basket and form will dispose the fruit in the basket, said form being downwardly movable to an extent to uncover said finger openings, permitting the operator to insert his fingers under the facing disk for the purpose of removing the latter and the filled basket bodily.

14. A fruit basket packer comprising a facing disk, supporting means upon which said facing disk rests removably, and a form surrounding said facing disk and normally co-operating therewith in forming a receptacle in which to pack the fruit, the upper end of said form serving to support an inverted fruit basket, whereby downward forcing of the basket and form will dispose the fruit in the basket, said upper end of the form having means to enter the basket rim to prevent the latter from marring the fruit upon descent of the basket.

15. A structure as specified in claim 12, the upper end of said form being receivable within the basket rim and having outstanding means to engage and support the latter.

16. An apparatus of the class described comprising a support, a facing member movably arranged upon said support, and a confining member guided on said support to lie below the upper edge of the facing member in order to permit the latter to be supplied with a facing layer, and to move above the upper edge of the facing member in order to permit the confining member to receive the articles to be contained in the packing receptacle, means for supporting the confining member in its elevated position, said means comprising movable detents, and a common means for moving said detents.

17. An apparatus of the class described comprising a removable facing member, an open ended confining member having means for supporting a basket in an inverted position thereon, and means for supporting said facing member and confining member for relative movement and for moving the confining member below and in spaced relation to the facing member so that the confining member may lie at its upper edge above the facing member to receive the fruit, and that the upper edge of the confining member may also lie below the under face of the facing member in order that the fruit may be placed on the facing member and the hands of a user may be passed between the under side of the facing member and the upper edge of the confining member to lift the facing member and an inverted basket of fruit thereon off the supporting means.

ARTHUR H. PHILLIPS.